April 21, 1931.  A. D. DOUGLASS  1,801,907
OPERATING BOARD
Filed May 25, 1929
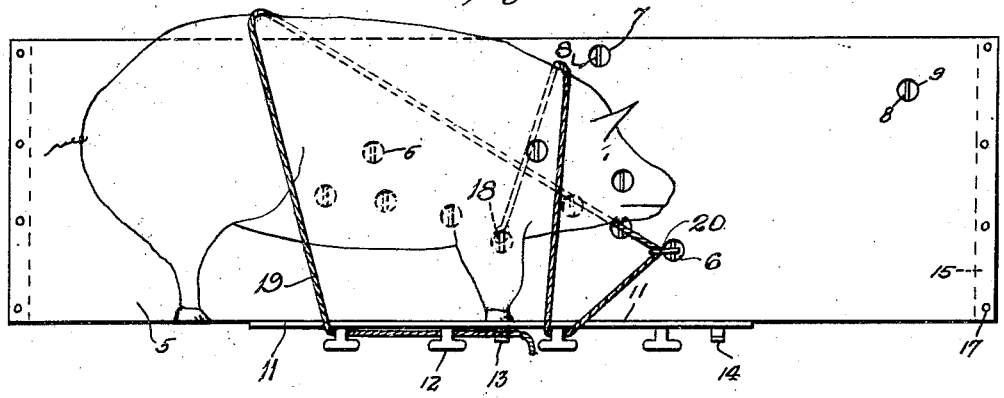
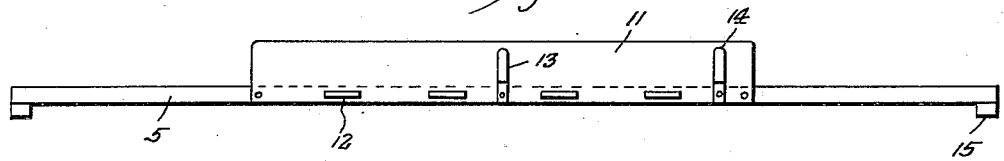
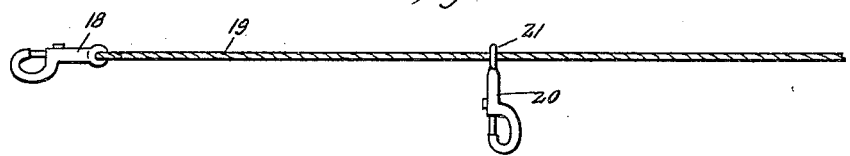
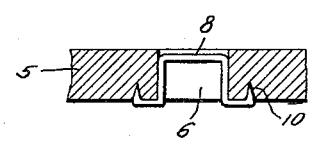
Inventor
Andrew D. Douglass,
By Clarence A. O'Brien
Attorney Patented Apr. 21, 1931

1,801,907

UNITED STATES PATENT OFFICE

ANDREW D. DOUGLASS, OF MALCOM, IOWA

OPERATING BOARD

Application filed May 25, 1929. Serial No. 365,888.

This invention relates to operating boards and more especially to an operating board for use by farmers and veterinarians when administering to animals.

A primary object of the invention is to provide an operating board especially adaptable for operating upon hogs or pigs, wherein the hog or animal to be operated upon may be easily placed on the board and secured thereon in proper position to be administered to.

Another very important object of the invention is to provide a board of the character above mentioned which will be very simple in construction, strong, durable, practical and thoroughly reliable in use.

Other objects and advantages of the invention will become apparent during a study of the following description, taken in connection with the accompanying drawings, wherein:

Figure 1 is a top plan view of the invention.

Figure 2 is a side elevation thereof.

Figure 3 is a fragmentary detail view, showing one end of a rope to be used in conjunction with the invention.

Figure 4 is a fragmentary detail sectional view of the board and illustrating the manner of securing the staples thereto.

With reference more in detail to the drawings, it will be seen that the invention embodies a substantially elongated rectangular board 5, which board may be formed of wood or any suitable material and which board is provided intermediate its ends with a series of openings 6, and opening 7 adjacent one longitudinal edge of the board, and an opening 9 adjacent the right hand end of the board as is clearly illustrated in Figure 1. Each of the openings 6 and also the openings 7 and 9 respectively have disposed therein a substantially U-shaped staple 8, the bight of which staple is preferably disposed within the opening adjacent the top face of the board and the legs of the staples being preferably bent outwardly and said legs having their sharpened extremities 10 embedded in the board in a manner clearly shown in Figure 4.

The board 5 has secured thereto at one longitudinal edge thereof and intermediate the ends of the board a relatively narrow elongated strip of wood or metal 11, as shown to advantage in Figure 2. The member 11 is provided along one longitudinal edge thereof, preferably the lower longitudinal edge, with a plurality of spaced cleats 12, and the cleats 12 are herein shown in the form of a T but it is to be understood that any other form of cleat may be used to advantage.

Secured to the outer face of the side member 11 and intermediate the end of the said side member is a spring keeper 13, while a second spring keeper 14 is secured to the side member 11 at one end of the member as clearly illustrated in Figure 2.

The board 5 is provided at each end thereof with a cleat 15, the said cleats 15 being secured to the under surface of the board by means of screws or other suitable fastening elements such as designated generally by the reference character 17 and it will be noted that these cleats 15 extend transversely of the board, and as is obvious will prevent lateral movement of the board when the same is disposed upon the supporting means as to be hereinafter more fully set forth.

When in use, the animal to be operated upon is placed on the board, preferably on his left side and disposed thereon well toward the left hand end of the board. The animal being so placed on the board, a snap hook 18 which is of the conventional structure as shown is snapped upon one of the staples 8, it being of course understood that the opening 6 is sufficiently large to receive the snap hook and the rope 19, one end of which is secured to the snap hook 18 as illustrated. Said rope 19 may be of any suitable length and is passed around the animal's neck just back of the jaws and ears after which the rope is then given a turn about one of the cleats 12, the particular cleat depending upon the adjustment desired, after which the rope is then passed over the animal's side and the snap hook 20, which snap hook 20 is slidably received on the rope 19 as at 21, is snapped into engagement with one of the other of said staples depending of course, upon the adjustment to be made.

The free portion of the rope is then brought back over the animal just in front of the hind quarters after which the rope is then given a turn over one of the intermediate cleats 12 and the free end of the rope then disposed in one of the spaced keepers 13 or 14.

It is well known that on nearly all farms where a great number of hogs are raised a long narrow pen is provided commonly called a chute or animal trap and into which trap the animals are driven a few at a time, and administered to, without disturbing the rest of the herd, and in the contemplation of this invention, the operating board may be disposed transversely of the chute or trap to rest on the side walls of the trap (not shown) to facilitate placing an animal on the board, although as is apparent the board may also be equipped with legs to provide a support therefor if it be so desired. However, in the preferred embodiment of the invention, supporting legs for the boards are dispensed with so that the boards may be easily handled and capable of being lowered to the ground so that the animals may be released therefrom without fear of injury.

From the foregoing then, it will be seen that I have provided a very simple operating board for use by farmers as well as veterinarians whereby animals may be quickly and easily secured to the board when disposed thereon and administered to in a convenient manner. It will be also seen that I have provided a board whereby the animal may be quickly and easily secured thereto and which will prove very advantageous due to the fact that the rope for securing the animal to the board has suitable connecting means with the board so as to obviate the tying of knots in the rope so as to secure the animal in place.

It will also be seen that the board may be secured or supported in place, when in use, either upon the ground or upon any other suitable supporting structure.

Even though I have herein shown and described certain detail structure elements of the invention, it is to be understood that the same is fully capable of changes coming within the spirit of the invention and the scope of the appended claims.

What is claimed is:

1. In a structure of the class described, a substantially flat elongated rectangular board, said board being provided with a plurality of openings formed therein, a staple disposed substantially entirely in each of said openings, said board adapted to receive an animal thereon, an elongated flexible member, a hook carried by one end of said flexible member, said hook adapted to engage with one of the staples and said flexible member adapted to be passed around the body of the animal, a hook slidably carried by said flexible member and adapted to engage with another of said staples, spaced cleats projecting laterally from one edge of the board, the free portion of said flexible member adapted to be cast around one of said cleats, and a spring clip held by the board and adapted to receive the free end of said flexible member.

2. A board for veterinary purposes characterized by being provided with a plurality of openings extending therethrough from the top to the bottom face of the board, a plurality of staples secured to the board, there being one staple for each of said openings, said staples respectively having their major portions arranged within the opening and terminating inwardly of the openings from the top face of the board, a side member secured to said board at one longitudinal edge of the board, said side member having its upper edge disposed above the top face of the board, cleats projecting laterally from said side member, a pair of spaced apart clips carried by said side member, a flexible member, a staple engaging member on one end of said flexible member and adapted to be engaged with one of said staples, said flexible member adapted to be passed about the animal reclining on said board, being passed around the animal's neck rearwardly of the jaws and ears of the animal prior to being given turns about one of said cleats, and a second staple engaging member slidable on said flexible member adapted to be snapped into engagement with another of said staples, and a remaining portion of said flexible member being trained over the animal forwardly of the hind quarters of the animal prior to being twisted over a second one of said cleats with the free end of said flexible member finally being disposed in engagement with one of said spring clips for retaining the animal in a predetermined position on the board.

In testimony whereof I affix my signature.

ANDREW D. DOUGLASS.